United States Patent [19]

Arthur et al.

[11] 4,133,454

[45] Jan. 9, 1979

[54] APPARATUS FOR DETERMINING THE LENGTH OF A COLUMN OF TOBACCO OR SIMILAR MATERIAL

[75] Inventors: Hugh M. Arthur; Timothy C. Harrington, both of London, England

[73] Assignee: Molins Limited, England

[21] Appl. No.: 729,467

[22] Filed: Oct. 4, 1976

[30] Foreign Application Priority Data

Oct. 8, 1975 [GB] United Kingdom .............. 41154/75

[51] Int. Cl.² .......................... B67D 5/08; G05D 9/00
[52] U.S. Cl. .................................. 222/56; 73/304 C; 222/64
[58] Field of Search ................. 73/304 C, 215, 194 E; 222/56, 64

[56] References Cited

U.S. PATENT DOCUMENTS

| | | | |
|---|---|---|---|
| 2,311,747 | 2/1943 | Gooch, Jr. ........................ | 222/56 X |
| 2,541,743 | 2/1951 | Brockman et al. ............... | 73/304 C |
| 3,253,745 | 5/1966 | Skelton ............................ | 222/56 |
| 3,283,577 | 11/1966 | Schuck ............................ | 73/304 C |
| 3,376,746 | 4/1968 | Roberts ........................... | 73/304 C |
| 3,744,314 | 7/1973 | Lenny ............................. | 73/304 C |
| 3,821,900 | 7/1974 | Preikschat ...................... | 73/304 C |
| 3,939,360 | 2/1976 | Jackson .......................... | 73/304 C X |

Primary Examiner—Daniel M. Yasich
Attorney, Agent, or Firm—Craig & Antonelli

[57] ABSTRACT

Apparatus for determining the height of a column of tobacco or similar particulate material in a downwardly extending channel, comprising a first capacitor, a second capacitor formed partly by an electrode plate extending above and below the desired average level of the top surface of the tobacco column in the channel during use, a third capacitor formed partly by an electrode plate lying permanently below the top surface of the tobacco column, and an electrical circuit which compares the value of the second capacitor with the sum of the values of the first and third capacitors and from which output signal can be obtained which reflects that comparison.

23 Claims, 8 Drawing Figures

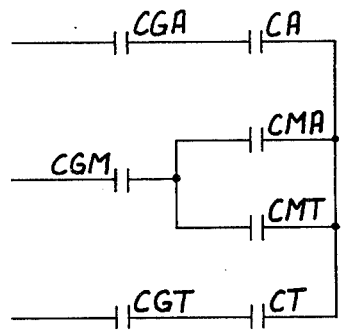
Fig. 7.
Fig. 8.
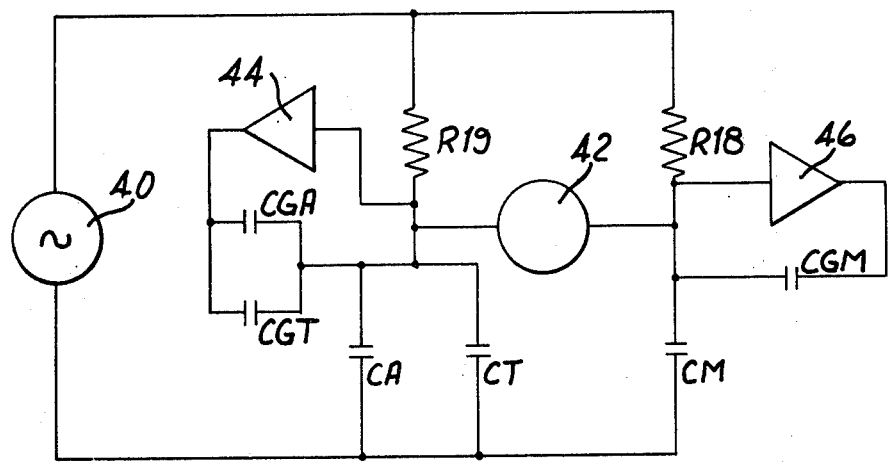

APPARATUS FOR DETERMINING THE LENGTH OF A COLUMN OF TOBACCO OR SIMILAR MATERIAL

This invention is concerned particularly with cigarette making machines including a hopper in which tobacco is fed into a downwardly extending channel so as to build up in the channel a column of tobacco of which the height is required to be controlled. One example of such a hopper is described in U.S. patent application Ser. No. 415,470, abandoned to which reference is directed in its entirety. This invention is also applicable, for example, to a tobacco feed system in which tobacco is fed pneumatically into one end of a horizontal channel, is withdrawn continuously from the other end of the channel and piles up in the channel to form a column of which the length is required to be controlled. For convenience, the invention will be defined and described with reference to a downwardly extending channel, but it should be understood that the channel could alternatively be horizontally orientated.

According to the present invention, apparatus for determining the height of a column of tobacco or similar particulate material in a downwardly extending channel comprises a first capacitor, a second capacitor formed partly by an electrode plate extending above and below the desired average level of the top surface of the tobacco column in the channel during use, a third capacitor formed partly by an electrode plate lying permanently below the top surface of the tobacco column, and an electrical circuit which compares with the value of the second capacitor with the sum of the values of the first and third capacitors and from which an output signal can be obtained which reflects that comparison. The output signal provides an indication of the height of the tobacco column.

As mentioned in the above-mentioned prior patent application, tobacco may be fed continuously from the lower end of the channel, while the delivery of tobacco into the upper end of the channel is controlled in order to maintain the height of the column substantially constant.

Preferably the electrical circuit comprises a bridge circuit which is in balance when the value of the second capacitor (which depends upon the height of the tobacco column) is equal to the sum of the values of the first and third capacitors. When the bridge is in balance, the output signal from the electrical circuit is preferably zero.

The second and third capacitors preferably both comprise opposed electrode plates lying on opposite sides of the column. The first capacitor may also comprise two opposed electrode plates lying above the electrodes of the second capacitor on opposite sides of the channel; alternatively, the first capacitor may comprise a separate fixed or variable capacitor.

One advantage of apparatus according to this invention, compared with a single capacitor, is that it is not affected by the dielectric constant or relative permitivity of the tobacco or other substance between the electrodes. This is because changes in the dielectric constant or relative permitivity (for example, as a result of a varying moisture content in the tobacco) affect equally or similarly the value of the third capacitor and part of the value of the second capacitor which is attributable to the part of the space between the electrodes of the second capacitor which is filled with tobacco.

Examples of apparatus according to this invention are shown in the accompanying drawings. In these drawings:

FIG. 7 shows the equivalent electrical circuit representation of the channel shown in FIG. 6; and FIG. 8 shows an electrical circuit than can be used with the channel shown in FIG. 6.

FIG. 1 is a section in a vertical plane through part of a downwardly extending tobacco-conveying channel for use in a cigarette making machine. The channel comprises a front wall 2 and a rear wall 4; these walls may be spaced apart by a uniform distance which will be termed the "thickness" of the channel.

Figure 3:
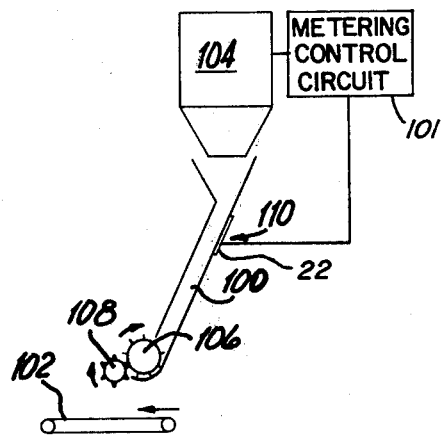
FIG. 3 is a diagrammatic elevation of part of a cigarette making machine including the channel shown in FIG. 1.

The channel (identified by the reference numeral 100 in FIG. 3) has a width which is sufficient to accommodate a column of tobacco which is used to form a loose carpet of tobacco on a conveyor band 102 (see FIG. 3). The tobacco carried by the band 102 may be showered onto a transversely-moving narrow band (not shown) to form a cigarette filler stream in a well-known manner. The width of the channel 100 (i.e. measured transversely to the direction of movement of the band 102) may, for example, be approximately 600 mm.

Tobacco is delivered into the upper end of the channel 100 either continuously or intermittently by a metering device 104, and is continuously withdrawn from the lower end of the channel 100 by a carded roller 106; a picker roller 108 removes the tobacco from the roller 106 and projects it onto the band 102. A column of tobacco 6 builds up in the channel 100, the tobacco column having an upper surface 6A (see FIG. 1).

Part of the channel (identified as 110 in FIG. 3) is formed by four plate electrodes 8, 10, 12 and 14 (see FIG. 1) which preferably extend across substantially the entire width of the channel. The electrode 8 forms part of the rear wall 4 of the channel, while the electrodes 10, 12 and 14 form part of the front wall 2 of the channel. The electrodes 10, 12 and 14 are spaced apart by spacers 16 and 18 of insulating material; similarly, there are spacers 20 which insulate the electrodes from upper and lower parts 2A, 4A, 2B, 4B of the channel walls 2 and 4. Behind the rear electrode 8 there is a guard electrode 22 which is spaced from the electrode 8 by a predetermined distance, with an air gap between the electrodes 8 and 22.

Figure 2:
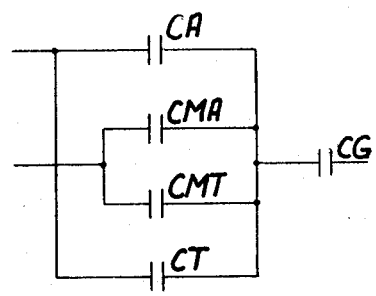
FIG. 2 shows the equivalent electrical circuit representation of the apparatus shown in FIG. 1.

The rear electrode 8 serves as a common electrode for three capacitors formed respectively with the electrodes 10, 12 and 14. FIG. 2 shows in simple form how the capacitors are connected.

Figure 1:
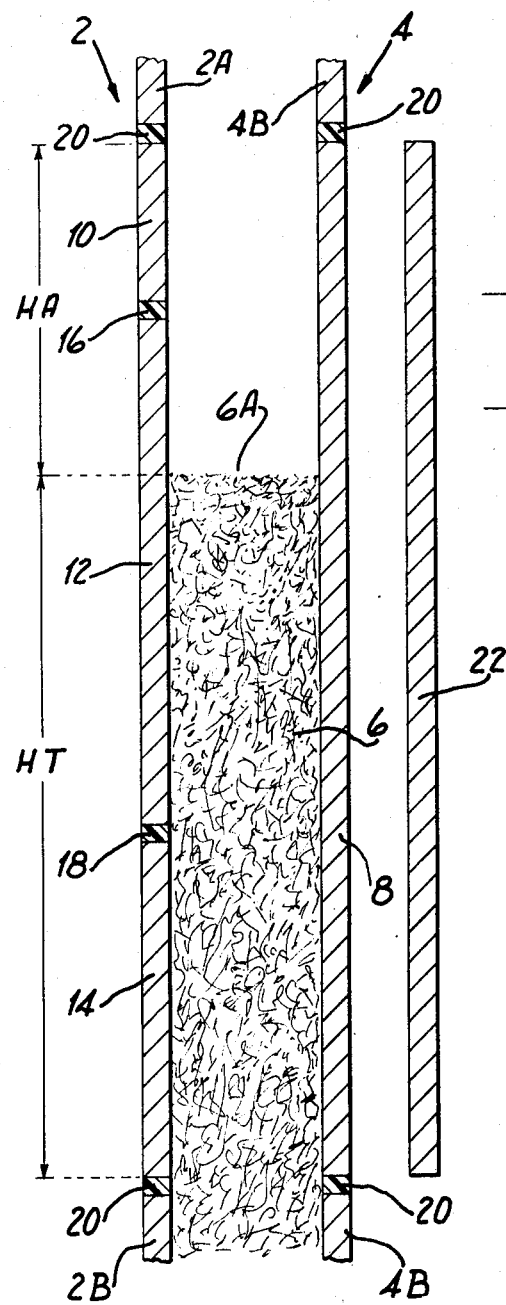
FIG. 1 is a section in a vertical plane through part of a channel for tobacco.

In FIG. 1 the capacitor formed by the electrodes 8 and 10 has an air gap between the electrodes (apart from the tobacco which is intermittently or possibly continuously showered through the space between the electrodes to form the column 6); this capacitor is represented in FIG. 2 as capacitor CA. The capacitor formed by the electrodes 8 and 14 (the space between which is permanently filled with tobacco) is represented as capacitor CT. Finally, in FIG. 2 the capacitor formed by the electrodes 8 and 12 is represented as two capacitors, namely CMA and CMT, which are connected in parallel; CMA is the capacitance between the electrodes 8 and 12 above the level of the surface 6A of the tobacco, i.e. where there is an air gap between the electrodes (apart from the tobacco shower therebetween), while CMT represents the capacitance between the electrodes 8 and 12 below the surface 6A. When the upper surface 6A of the tobacco column is at the desired level, CA is equal to CMA, and CT is equal to CMT.

The capacitance between the rear electrode 8 and the guard electrode 22 is represented as CG. The purpose of the guard electrode is to screen the rear electrode 8 from external electrical interference. If electrode 22 was grounded, the capacitance CG (being typically much larger than CA + CT + CM) would greatly attenuate the signal at electrode 8. However, as described below, electrode 22 is driven by a voltage follower amplifier whose input is connected to electrode 8. If the voltage follower were perfect, the signal at electrode 22 would be equal to that at electrode 8, so no current would flow in the capacitor CG which would thus have no effect on the signal at electrode 8. In practice, the voltage follower will not quite have unity gain, so the signal will be slightly attenuated.

In the electrical circuit, CA and CT comprise respectively the air reference capacitor and the tobacco reference capacitor. The capacitor formed by electrodes 8 and 12 serves as a measurement capacitor. In the electrical circuit which is shown in detail in FIG. 4, the reference capacitor (CA + CT) and the measurement capacitor (identified as CM) are driven by equal but opposite phase AC voltages from an oscillator and inverting amplifier as shown. The resulting signal which is obtained from the rear electrode 8 is buffered by a high impedance input voltage follower. The output of this drives the guard electrode and is fed to a phase-sensitive rectifier of which the output, at terminal T is a D.C. voltage indicative of the height of the tobacco column. This output signal (at terminal T) may be used to vary automatically the rate at which tobacco is fed into the channel by the metering device 104 (FIG. 3) so as to maintain the height of the tobacco column substantially constant.

For example, the metering device may be operable selectively at upper and lower speeds by a metering control circuit 101. When the upper surface of the tobacco column falls below the desired level, the metering device is automatically operated at its upper speed; when the upper surface of the tobacco column rises above the desired level the metering device is automatically operated at its lower speed. Alternatively, since the height measurement apparatus according to this invention gives a very accurate indication of the tobacco height, the signal representing the tobacco height can be used to vary steplessly the speed at which tobacco is fed into the channel by the metering device, so that during stable operating conditions the metering device feeds tobacco into the channel continuously at the rate at which tobacco is fed from the lower end of the channel by the roller 106.

The value of the D.C. voltage output at the terminal T is proportional to $$[CM - (CA + CT)]/[CM + (CA + CT)]$$

The values of the various resistors and capacitors shown in FIG. 3 are as follows:
C1 330 pF (i.e. 330 picofarads)
C2 33 nF
C3 0.22 uF
C4 0.22 uF
R1 100K (i.e. 100,000 ohms)
R2 100K
R3 100K
R4 1K
R5 100K
R6 100K
R7 47K
R8 47K
R9 100K
R10 10K
R11 10K
R12 10K
R13 240K
R14 390K
R15 15K Each of the amplifiers identified as 741 is a differential input operational amplifier; for example, each of these amplifiers may be of the type made by Texas Instruments Limited and identified as SN 72741P. The reference D1 and D2 refer to a Zener diode, for example that identified as BZY 88 (7.5v). TR1 is a transistor, e.g. that identified as BC107.

Figure 4:
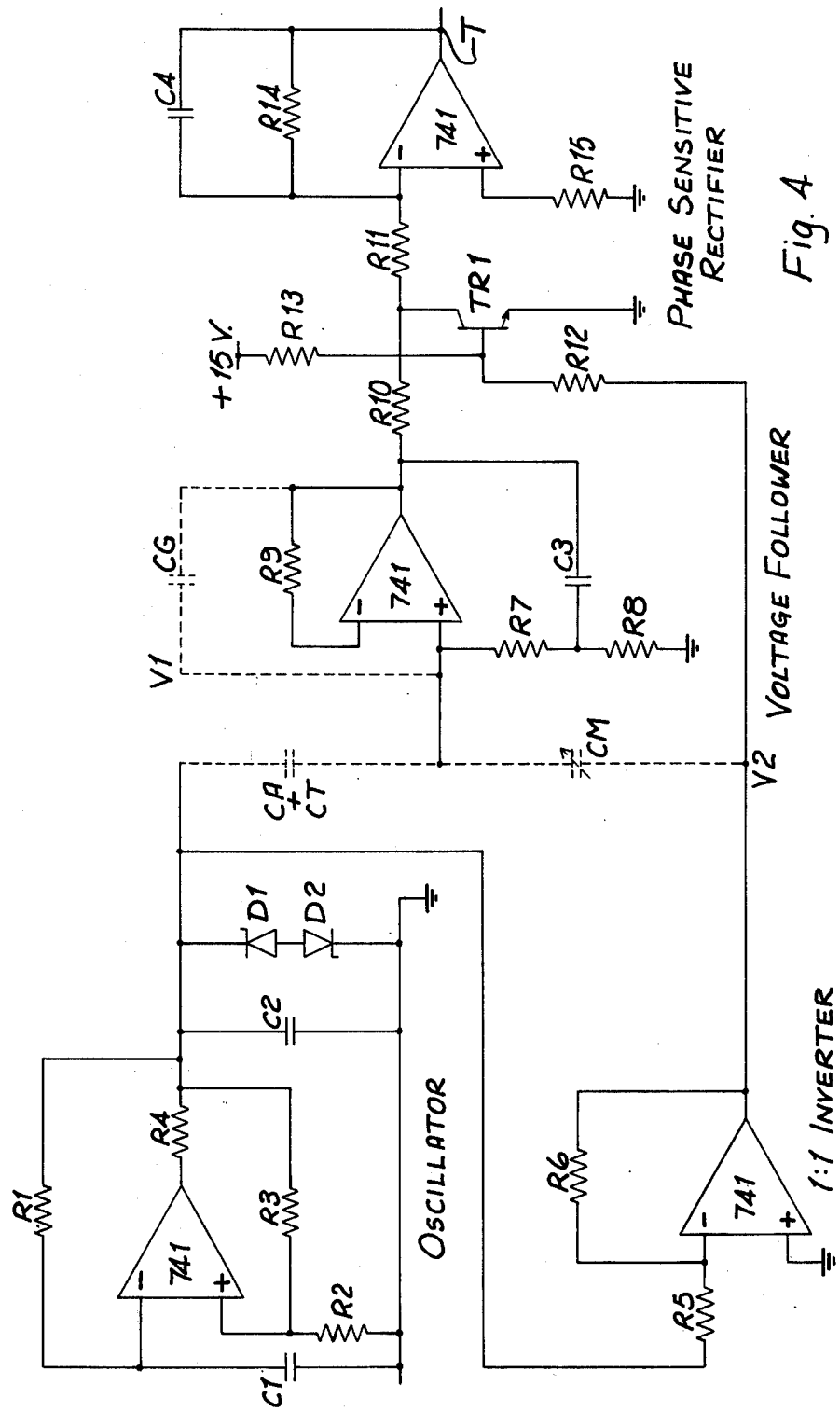
FIG. 4 is a circuit diagram of one form of apparatus embodying the invention, including the channel shown in FIG. 1.

The circuit shown in FIG. 4 was designed for an apparatus in which CA + CT = 47pF, CM = 47pF (at the desired tobacco level), and CG = 1000pF.

As an alternative, the channel may have a thickness (i.e. a spacing between front and rear walls) which increases from 18 mm at the upper end to 21 mm at the lower end, the height of the channel being 515 mm and the desired height of the upper surface of the column of tobacco in the channel being 405 mm above the lower end of the channel. The tobacco is assumed to have a relative permittivity of approximately 3.0, this being a typical value for tobacco at a density of 60 mg/ml and with an average moisture content (e.g. about 12 or 13%). Assuming that the tobacco density does not vary with height (which need not necessarily be the case), but taking into consideration the slight divergence of the walls of the channel, the heights of the electrodes equivalent to the electrodes 10, 12 and 14 in the apparatus shown in FIG. 1 were calculated to be 54.4 mm, 252.1 mm and 208.5 mm. The separation between the rear electrode 8 and the guard electrode 22 was set to the arbitrary distance of 1 mm. With these dimensions, the various values were found to be as follows:
CA 15.9 pF
CT 162.8 pF
CM 178.7 pF
CG 2,732 pF FIG. 1 shows a channel of which the front and rear walls in fact do not diverge. Furthermore, by way of example, FIG. 1 shows that the total height of the electrodes is HT + HA where HT is the height of the portion of the column of tobacco contained within the electrodes, and HA is the height of the air space between the electrodes. The balance condition occurs when the surface 6A of the tobacco column is at a distance of ½ HA below the top edge of the electrode 12, and at a distance of ½ HT above the bottom edge of the electrode 12; and the heights of the electrodes 10 and 14 respectively are ½ HA and ½ HT. These values are approximately true in the case of a channel with parallel walls, and assuming that the tobacco density is substantially constant in the region of the electrodes.

Figure 5:
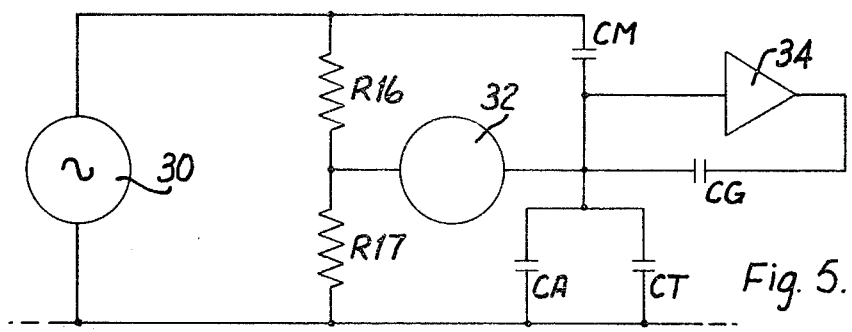
FIG. 5 is a simplified diagram of an alternative electrical circuit that can be used with the channel shown in FIG. 1.

The balanced state (i.e. with the surface 6A of the tobacco column at the desired height) need not necessarily occur when CM is equal to CA + CT. However, to ensure that the circuit is insensitive to variations in the tobacco's relative permittivity, it is essential that the ratio of CMA to CMT is equal to the ratio of CA to CT. The circuit of FIG. 4 could be used by setting the gain of the inverting amplifier such that $(V1/V2) = [-CM/(CA + CT)$ FIG. 5 shows an alternative circuit in which two resistors, R16 and R17, together with the capacitors CM and CA + CT, form a bridge circuit. An oscillator 30 applies a potential across the bridge circuit, and a balanced state detected by a phase sensitive detector 32 occurs when the ratio of CM to CA + CT is inversely proportional to the ratio of R16 to R17. As in the circuit of FIG. 4, the common electrode of CA, CM and CT is screened by a guard electrode (forming capacitance CG) which is driven by a voltage follower 34.

Figure 6:
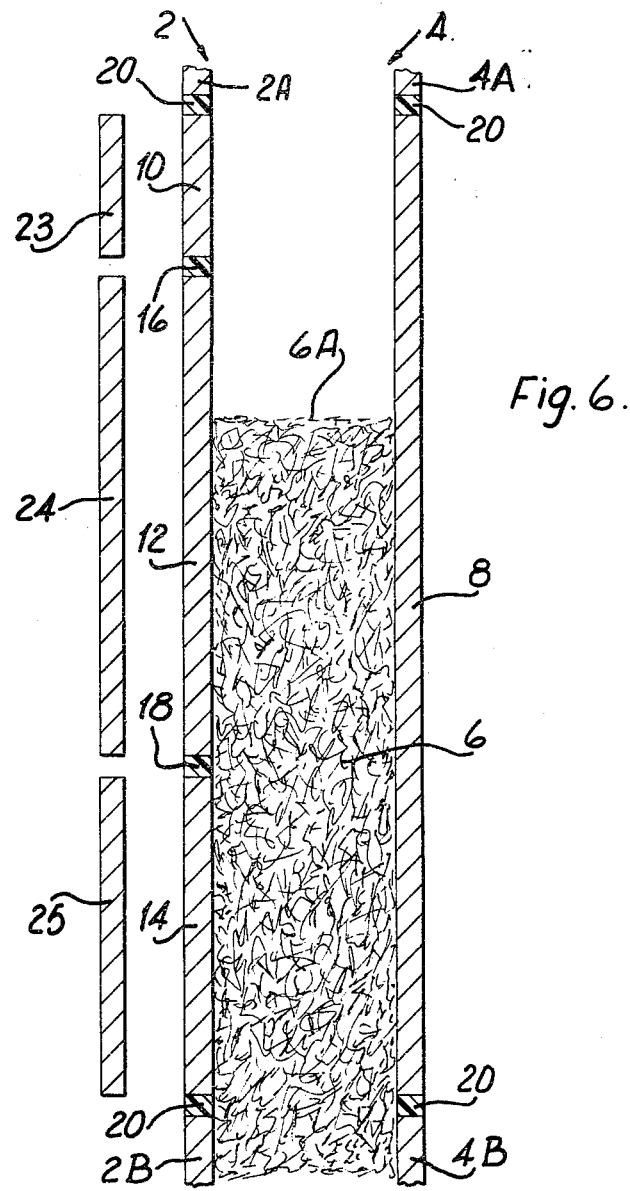
FIG. 6 is a view similar to FIG. 1 but of a channel having an alternative arrangement of electrodes.

In the alternative electrode configuration shown in FIGS. 6 and 7, the electrodes 8, 10, 12 and 14 are exactly as those shown in FIG. 1 with the same reference numbers, and form capacitors CA, CMA, CMT and CT. However, separate guard electrodes 23, 24 and 25 respectively are provided to screen electrodes 10, 12 and 14. Electrode 23 screens electrode 10 and the capacitance between them is represented in FIG. 7 as CGA. Electrode 24 screens electrode 12 and the capacitance between them is represented as CGM. Electrode 25 screens electrode 14 and the capacitance between them is represented as CGT.

As with the electrode configuration of FIG. 1, the attenuating effect of CGA, CGM and CGT on the signals at 10, 12 and 14 respectively can be greatly reduced by driving them with voltage follower circuits whose respective inputs are connected to the electrodes being screened.

An alternative bridge circuit is shown in FIG. 8. Here the common electrode of CA, CT and CM is connected to an oscillator 40, so the electrode configuration used is that of FIG. 6. Separate voltage followers 44 and 46 drive the guard electrodes screening the electrodes of CA, CT and CM connected to the inputs of a phase sensitive detector 42. The oscillator 40 applies a potential across the bridge formed by the resistors R18 and R19 and CA, CT and CM. The balanced state detected by the phase sensitive detector 42 occurs when the ratio of CM to CA + CT is inversely proportional to the ratio of R18 to R19.

In both the circuits of FIGS. 5 and 8, the resistors R16 and R17, and R18 and R19 could be replaced by capacitors or inductances.

We claim:

1. Apparatus for determining the height of a column of tobacco or similar particulate material showered into a downwardly extending channel having walls and being opened at both ends, comprising a first capacitor having a fixed value; a second capacitor having spaced electrode plates which extend along the channel above and below a desired average preselected level of the top surface of the tobacco column in the channel, whereby the space between the plates contains tobacco in a lower region and air in an upper region when the top surface of the tobacco column is at said preselected height; a third capacitor having spaced electrode plates which extend along the channel, below the second capacitor, whereby the space between the plates of the third capacitor is permanently filled with tobacco which has passed between the plates of the second capacitor; and control means connected to said first, second and third capacitors for comparing the value of the second capacitor with the sum of the values of the first and third capacitors and producing a column height signal which is unaffected by the moisture content of the tobacco and is effective for controlling the height of the tobacco column to maintain said preselected level.

2. Apparatus according to claim 1 in which the first capacitor comprises a pair of mutually opposed electrode plates lying on opposite sides of the channel and extending along the channel in a position permanently above the level of the top surface of the tobacco column.

3. Apparatus according to claim 2 in which the electrode plates of all three capacitors lie on one side of the channel and are structurally joined with one another to form a common electrode plate.

4. Apparatus according to claim 3 including a guard electrode arranged to screen the common electrode plate from external electrical interference.

5. Apparatus according to claim 1 in which the control means comprises a bridge circuit.

6. Apparatus according to claim 5 in which the relative values of the capacitors and the arrangement of the bridge circuit are such that the bridge circuit is in balance when the value of the second capacitor is equal to the sum of the values of the first and third capacitors.

7. Apparatus according to claim 5 in which the bridge circuit includes an oscillator and an inverting amplifier.

8. Apparatus according to claim 5 in which the bridge circuit includes a pair of resistors or a pair of capacitors or inductances related to one another by the same ratio (or the inverse thereof) as the ratio of the second capacitor to the sum of the first and third capacitors.

9. Apparatus according to claim 1 including means for feeding tobacco continuously from the lower end of the channel, and means for feeding tobacco into the upper end of the channel at a speed which varies in response to the column height signal of said control means so as to maintain substantially the height of the column of tobacco in the channel.

10. Apparatus according to claim 1 in which the relative sizes of the capacitor plates are such that the ratio of the value of the first capacitor to the value of the third capacitor is equal to the ratio of the value of the capacitance of the part of the second capacitance above the level of tobacco, to the capacitance of the part of the second capacitance below the level, when tobacco is present in the apparatus at the desired level.

11. Apparatus according to claim 10 in which the relative sizes of the capacitor plates are such that the value of the second capacitor is equal to the sum of the values of the first and third capacitors when tobacco is present in the apparatus at the desired level.

12. Apparatus for feeding a uniform carpet of tobacco onto a conveyor to form a cigarette filler stream for a cigarette-making machine, said apparatus comprising a pair of downwardly extending walls forming a channel, a metering device mounted above the channel so as to feed tobacco into the upper end of the channel to build up a column of tobacco in the channel; means for with-drawing the tobacco from the lower end of the channel onto the conveyor, a capacitive level-sensing device including a plurality of first electrode plates arranged at different levels on one side of the channel, a common second electrode plate on the other side of the channel in capacitive relationship with said first electrode plates, and a guard electrode arranged to screen said common second electrode plate from external interference; and circuit means connected to the level-sensing device and arranged to control the metering device so as to maintain the level of the tobacco column at a desired height.

13. Apparatus as claimed in claim 12 in which the capacitive level-sensing device includes one first electrode plate arranged on one side of the channel permanently above the desired average level of the tobacco column in the channel; another first electrode plate arranged on the said one side of the channel and extending above and below the desired average level of the top surface of the tobacco column in the channel, a further first electrode plate arranged on the said one side of the channel and lying permanently below the desired average level of the tobacco column in the channel, said second electrode plate being arranged on the other side of the channel and facing all of the said first electrodes and being co-extensive therewith, so as to form respectively first, second and third capacitors all having one common electrode plate; and in which the said circuit means comprises an electrical circuit which compares the value of the second capacitor with the sum of the values of the first and third capacitors and thereby produces a control signal for the metering device which is related to the height of the said tobacco column.

14. Apparatus as claimed in claim 13 in which the said electrode plates form part of the walls of the channel.

15. Apparatus for feeding tobacco in a uniform stream, comprising a pair of substantially parallel, downwardly extending walls; feed means for feeding tobacco into the upper end of the channel to build up a column of tobacco in the channel; means for feeding tobacco continuously from the bottom end of the channel; a first capacitor having spaced electrode plates mounted adjacent to the channel above the top of the column of tobacco in the channel; a second capacitor having spaced electrode plates which extend along the channel above and below the desired level of the top surface of the tobacco column in the channel, whereby the space between the plates contains tobacco in a lower region and air in an upper region; a third capacitor having spaced electrode plates mounted adjacent to the channel, below the second capacitor, whereby the space between the plates of the third capacitor is permanently filled with tobacco which has passed between the plates of the second capacitor; an electric circuit arranged to compare the second capacitor with the sum of the values of the first and third capacitor for producing a column height signal unaffected by the moisture content of the tobacco; said feeding means being controlled by said column height signal to maintain substantially constant the height of the column of tobacco in the channel.

16. Apparatus according to claim 15 in which one electrode plate is common to all three capacitors and forms part of one wall of the channel, the other wall of the channel including an area coextensive with the said part, which area is divided into three sections each of which sections forms the other electrode plate of one of the three capacitors.

17. Apparatus according to claim 16 including a guard electrode arranged to screen the common electrode plate from external electrical interference.

18. Apparatus according to claim 15 in which the electrical circuit comprises a bridge circuit.

19. Apparatus according to claim 18 in which the relative value of the capacitors and the arrangement of the bridge circuit are such that the bridge circuit is in balance when the value of the second capacitor is equal to the sum of the values of the first and third capacitors.

20. Apparatus according to claim 18 in which the bridge circuit includes an oscillator and an inverting amplifier.

21. Apparatus according to claim 18 in which the bridge circuit includes a pair of resistors or a pair of capacitors or inductances related to one another by the same ratio (or the inverse thereof) as the ratio of the second capacitor to the sum of the first and third capacitors.

22. Apparatus according to claim 15 including means for feeding tobacco continuously from the lower end of the channel, and means for feeding tobacco into the upper end of the channel at a speed which varies in response to the output signal from the electrical circuit so as to maintain substantially the height of the column of tobacco in the channel.

23. Apparatus for feeding tobacco in a uniform stream, comprising a pair of substantially parallel, downwardly extending walls forming a channel; feeding means for feeding tobacco into the upper end of the channel to build up a column of tobacco in the channel; means for feeding tobacco continuously from the bottom end of the channel; a capacitor having spaced electrode plates which extend along the channel above and below the desired level of the top surface of the tobacco column in the channel, whereby the space between the plates contains tobacco in a lower region and air in an upper region; a further capacitor having spaced electrode plates mounted adjacent to the channel, below the first-mentioned capacitor, whereby the space between the plates of said further capacitor is permanently filled with tobacco which has passed between the plates of the first-mentioned capacitor; electric circuit means for comparing the values of the two capacitors for producing a column height signal unaffected by the moisture content of the tobacco; said feeding means being controlled by said column height signal to maintain substantially constant the height of the column of tobacco in the channel.

* * * * *